US008692462B2

(12) United States Patent
Hoffmann et al.

(10) Patent No.: US 8,692,462 B2
(45) Date of Patent: Apr. 8, 2014

(54) HALOGEN BULB FOR VEHICLE HEADLIGHTS

(75) Inventors: Christoph Hoffmann, Ichenhausen (DE); Jenny Trommer, Oberkocken (DE); Gabriele Wahl, Königsbronn (DE); Katja Zeller, Manching (DE)

(73) Assignee: OSRAM AG, Munich (DE)

( * ) Notice: Subject to any disclaimer, the term of this patent is extended or adjusted under 35 U.S.C. 154(b) by 0 days.

(21) Appl. No.: 13/390,116

(22) PCT Filed: Aug. 9, 2010

(86) PCT No.: PCT/EP2010/061537
§ 371 (c)(1),
(2), (4) Date: Mar. 6, 2012

(87) PCT Pub. No.: WO2011/018427
PCT Pub. Date: Feb. 17, 2011

(65) Prior Publication Data

US 2012/0146495 A1 Jun. 14, 2012

(30) Foreign Application Priority Data

Aug. 14, 2009 (DE) ......................... 10 2009 037 577

(51) Int. Cl.
*B60Q 1/04* (2006.01)

(52) U.S. Cl.
USPC ............ 313/578; 313/315; 313/316; 313/274

(58) Field of Classification Search
USPC ......... 313/484, 491, 493, 569, 573, 574, 631, 313/634, 635, 315–316, 274, 578–580, 313/341–345; 315/77, 82, 291, 224, 294
See application file for complete search history.

(56) References Cited

U.S. PATENT DOCUMENTS

| | | | | |
|---|---|---|---|---|
| 5,883,468 | A | 3/1999 | Hobbs et al. | |
| 2002/0135301 | A1* | 9/2002 | Knorr et al. | 313/578 |
| 2006/0038471 | A1* | 2/2006 | Buhler et al. | 313/271 |
| 2006/0091775 | A1* | 5/2006 | Auer et al. | 313/331 |
| 2010/0315002 | A1 | 12/2010 | Schmidt | |

FOREIGN PATENT DOCUMENTS

| | | | |
|---|---|---|---|
| CA | 2194288 | A1 | 2/1996 |
| DE | 19832773 | A1 | 4/1999 |
| DE | 102006052951 | A1 | 5/2008 |
| DE | 202007017598 | U1 | 7/2008 |
| WO | 9605610 | A1 | 2/1996 |
| WO | 2008151670 | A1 | 12/2008 |

OTHER PUBLICATIONS

English abstract of DE 102006052951.

* cited by examiner

*Primary Examiner* — Anh Mai
*Assistant Examiner* — Elmito Breval

(57) ABSTRACT

A halogen bulb for vehicle headlights, comprising at least one filament, which is designed such that it can be used as a light source for generating a low-beam or high-beam and during operation has a lower electric power consumption than the filaments of conventional halogen bulbs used to generate a low-beam or high-beam.

8 Claims, 2 Drawing Sheets

HALOGEN BULB FOR VEHICLE HEADLIGHTS

RELATED APPLICATIONS

The present application is a national stage entry according to 35 U.S.C. §371 of PCT application No.: PCT/EP2010/061537 filed on Aug. 9, 2010, which claims priority from German application No.: 10 2009 037 577.5 filed on Aug. 14, 2009.

TECHNICAL FIELD

The disclosure relates to lamps, and in particular to halogen incandescent lamps.

This disclosure relates to systems and methods for conducting online auctions and, more particularly, to systems and methods for conducting online municipal bond auctions.

BACKGROUND

A halogen incandescent lamp of this type is disclosed in WO 96/05610 Al for example. This publication describes a two-filament halogen incandescent lamp for vehicle headlights, especially an H4 lamp with two filaments for generating low beam or high beam.

In accordance with statutory regulations, such as ECE Regulation 37 or SAE for example, the low beam filament and high beam filament of a two-filament halogen incandescent lamp of type H4, H13 or HB2, which are designed for use at a nominal on-board network voltage of 12 volts, at a test voltage of 13.2 volts (for H4 and H13 lamps) or 12.8 volts (for HB2 lamps), generate a luminous flux in accordance with values shown in Table 1 below.

TABLE 1

| Lamp type | Luminous flux of the low beam filament | Luminous flux of the high beam filament |
|---|---|---|
| H4 lamp | 1000 lm ± 15% | 1650 lm ± 15% |
| H13 lamp | 1100 lm ± 15% | 1700 lm ± 15% |
| HB2 lamp | 910 lm ± 10% | 1500 lm ± 10% |

The electrical power consumption of the low beam filament of the H4, H13 and the HB2 lamp amounts to 55 watts at 12 volts in each case. The electric power consumption of the high-beam filament of the H4, H13 and HB2 lamp amounts to 60 watts at 12 volts in each case.

In addition single-filament halogen incandescent lamps for vehicle headlights are known which are able to be used as a light source in a low beam headlight or in a high beam headlight. Examples of such single-filament halogen incandescent lamps are H1, H3, H7 and H11 lamps.

In accordance with ECE Regulation 37 the filament of an H1, H3 H7 or H11 Lamp, which is designed for operation at an on-board network voltage of nominally 12 volts, at a test voltage of 13.2 volts, generates a luminous flux in accordance with values shown in Table 2 below.

TABLE 2

| Lamp type | Luminous flux |
|---|---|
| HI lamp | 1550 lm ± 15% |
| H3 lamp | 1450 lm ± 15% |
| H7 lamp | 1500 lm ± 10% |
| H11 lamp | 1350 lm ± 10% |

These single-filament lamps of type H1, H3, H7 or H11 each have an electrical power consumption of nominally 55 watts.

For vehicles which do not possess daytime running lights the power sources of the low beam headlights are normally used to generate a daytime running light or an always-on running light in countries in which driving with the lights on during the day is a requirement. The conventional halogen incandescent lamps listed above are however not designed in respect of their electrical power consumption and service life for use as always-on driving lights or daytime running lights.

SUMMARY

Various embodiments provide a generic halogen incandescent lamp for vehicle headlights which on the one band meets the requirements for use in generating low beam light or high beam light and on the other hand is better suited to be able to serve additionally as a daytime running light or always-on driving light.

The inventive halogen incandescent lamp for vehicle headlights has at least one incandescent filament which is embodied such that it is able to be used as a light source for generating the low beam or high beam. This means that the incandescent filament of the inventive halogen incandescent lamp is embodied such that during its operation with the test voltage of 13.2 volts or 12.8 volts, it generates a luminous flux which in the case of a two-filament halogen incandescent lamp, ranges from the luminous flux values of the low beam filament of conventional H4, HB2 or H13 lamps or, in the case of a single-filament incandescent lamp, ranges from the luminous flux values of conventional H1, H3, H7 or H11 lamps. In addition the incandescent filament of the inventive halogen incandescent lamp is embodied so that during its operation it has a lower electrical power consumption than filaments of conventional halogen incandescent lamps which are able to be used for generating low beam light or high beam light. In particular with the inventive versions of the single-filament halogen incandescent lamps of type H1, H3, H7 or H11, the filament is embodied so that during its operation with the test voltage of 13.2 volts it generates a luminous flux in the range of values of the conventional H1, H3, H7 or H11 lamps in accordance with ECE Regulation 37 as specified in Table 2, but has a lower electrical power consumption. In addition, in particular with the inventive versions of the two-filament halogen lamps of type H13, H4 or HB2, at least the low beam light filament is embodied so that, during operation with the test voltage of 13.2 volts or 12.8 volts, it generates a luminous flux in the range of values of the conventional H13, H4 or HB2 lamp in accordance with ECE Regulation 37 SAE, as specified in Table 1, but has a lower electrical power consumption. This means that the inventive halogen incandescent lamps, when used as daytime running lights or always-on lights result in a lower fuel consumption and a correspondingly lower $CO_2$ emission than conventional halogen incandescent lamps. In addition the inventive halogen incandescent lamps are embodied such that the aforementioned use and the correspondingly extended operating time, where possible, do not cause any reduction of the lamp replacement intervals.

The said filament of the halogen incandescent lamp is preferably embodied such that its electrical power consumption is smaller by at least 5%, preferably even by at least 8% than the electrical power consumption of the filament of the conventional halogen incandescent lamps. The electrical power consumption of the aforementioned filament of the inventive halogen incandescent lamp is less than 55 watts and preferably even less than 50 watts when operated at an on-board network voltage of nominally 12 volts.

The filament embodied as the coiled filament of the inventive versions of the single-filament halogen incandescent lamps and the low beam incandescent element embodied as the filament of the inventive two-filament halogen incandescent lamps preferably has a smaller wire gauge than the filament of the conventional single-filament halogen incandescent lamps or than the low beam filament of the conventional two-filament halogen incandescent lamps in order to make reduced power consumption possible in a simple manner.

In accordance with a preferred exemplary embodiment of an inventive single-filament halogen incandescent lamp, especially of an inventive version of an H7 lamp, the filament is embodied as a coiled filament, the length of which ranges from 4.20 mm to 4.35 mm and the pitch of which ranges from 250 μm to 260 μm and the wire gauge of which ranges from 148.9 μm to 153.1 μm. The core factor preferably ranges from 6.45 to 6.65 and the pitch factor ranges from 1.68 to 1.72.

In accordance with a preferred exemplary embodiment of an inventive two-filament halogen incandescent lamp, especially of an inventive version of an HB2 or H4 lamp, the low beam filament is embodied as a coiled filament, the length of which ranges from 5.40 mm to 5.60 mm and the pitch of which ranges from 265 μm to 285 μm and the wire gauge of which ranges from 159.6 μm to 164.1 μm. The core factor preferably ranges from 5.1 to 5.4 and the pitch factor ranges from 1.68 to 1.71.

The inventive halogen incandescent lamp advantageously contains krypton as a filler gas in addition to its halogen filling in order to reduce the tungsten evaporation rate of the filament and to prolong the life of the halogen incandescent lamp. Furthermore the filler gas can also include xenon in addition to krypton or instead of krypton, in order to reduce the tungsten evaporation rate of the filament and to prolong the life of the halogen incandescent lamp. Because of its greater atomic mass, xenon has a better effect than krypton, but is more expensive when used for this purpose.

The inventive halogen incandescent lamp possesses a vitreous lamp vessel enclosing the at least one filament, which can be equipped with an opaque and light-reflecting dome in order to increase the proportion of useful light of the lamp.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION

The following detailed description refers to the accompanying drawings that show, by way of illustration, specific details and embodiments in which the invention may be practiced.

Figure 1:
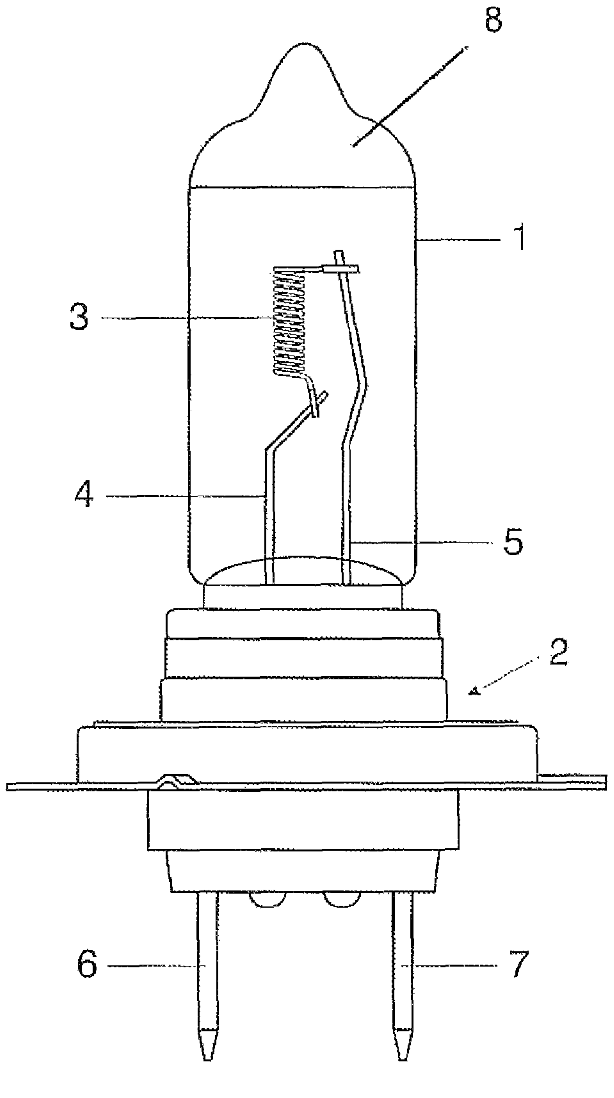
FIG. 1 a side view of a single-filament halogen incandescent lamp in accordance with the first exemplary embodiment of the invention in a schematic diagram FIG. 2 a side view of a two-filament halogen incandescent lamp in accordance with the second exemplary embodiment of the invention in a schematic diagram

FIG. 1 shows a schematic diagram of an inventive single-filament halogen incandescent lamp of type H7 in accordance with the first exemplary embodiment. It is designed for operation at an on-board vehicle network voltage of nominally 12 volts. This lamp has a vitreous, essentially cylindrical lamp body 1 which is provided at one end with a base 2. The other end of the lamp body 1, i.e. the tip 8 of the lamp body 1 is provided with an opaque, light-reflecting, silver-colored or green coating. Arranged within the lamp body 1 is a filament 3 embodied as a single coiled filament. The filament 3 is aligned axially or in parallel to the axis of the lamp body. The filament outputs of the filament 3 enclosed by a small molybdenum tube are welded in each case to a power supply lead 4, 5. The two power supply leads 4, 5 are each connected electrically-conductively to an electrical connection 6, 7 of the base 2. The lamp body 1 consists of quartz vitreous or hard vitreous, for example alumo-silicate vitreous. The interior of the lamp body 1 is filled with gas containing a halogen filling and a noble gas or noble gas mixture with the components xenon or respectively and krypton. The filler gas pressure at room temperature (22° C.) ranges from 1.0 Megapascal to 1.5 Megapascal. This single-filament halogen incandescent lamp or its filament 3 generates during operation at the test voltage of 13.2 volts a luminous flux in the range of 1500 lm±10%. The electrical power consumption of this lamp or its filament 3 amounts to 44.9 watts during operation with a voltage of 12 volts. The data of the filament 3 of an inventive H7 halogen incandescent lamp is listed in the left-hand column of Table 3 below. The corresponding data of the filament of a conventional H7 incandescent lamp is listed for comparison in the right-hand column of Table 3.

TABLE 3

| | Inventive H7 lamp | Conventional H7 lamp |
|---|---|---|
| Core factor | 6.557 | 6.396 |
| Wire gauge | 151 μm | 159.5 μm |
| Coiled filament length | 4.27 mm | 4.37 mm |
| Pitch | 257 μm | 263 μm |
| Pitch factor | 1.704 | 1.649 |
| Power consumption | 44.9 W | 55 W |

The term wire gauge refers to the thickness or the diameter of the tungsten wire of which the filament consists. The term core factor refers to the quotient of internal diameter of the coiled filament to the wire gauge. The term pitch refers to the sum of the wire gauge and the space or the distance between two adjacent windings of the coiled filament. The term pitch factor refers to the quotient of pitch to wire gauge. The term coiled filament length refers to the spatial extent of the wound part of the coiled filament measured in the direction of its winding axis.

Figure 2:
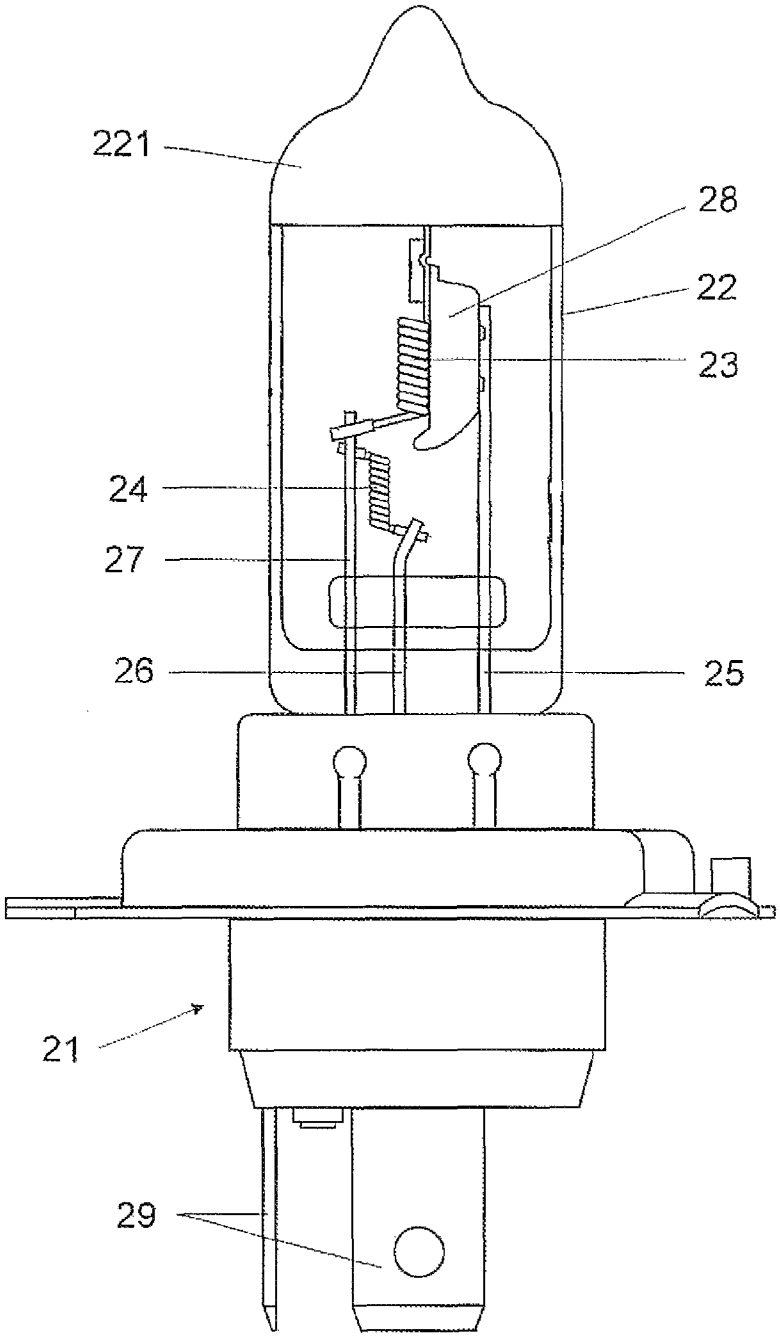

FIG. 2 shows a schematic diagram of an inventive two-filament halogen lamp of type HB2 or H4. It is designed for operation at an on-board vehicle voltage of nominally 12 volts. This vehicle headlight lamp possesses a vitreous lamp vessel 22 provided with a lamp base 21 which is embodied essentially axial-symmetrically. The interior space of the lamp vessel 22 is filled with gas containing a halogen filling and a noble gas or noble gas mixture with the components xenon or xenon and krypton respectively. This filler gas pressure at room temperature (22° C.) lies in the range of 0.4 Megapascal to 1.0 Megapascal. Arranged within the lamp vessel 22 are two filaments 23, 24, which are electrically contacted and fixed with the aid of power supply leads 25, 26 and 27. Each of the power supply leads 25 to 27 is routed out of the sealed end of the lamp vessel 22 and connected electrically-conductively to an electrical terminal 29 of the lamp base 21. The other end of the lamp vessel 22, i.e. the dome of the lamp vessel 22, is provided with an opaque, light-reflecting silver-colored or green coating 221. The three power supply leads 25, 26 and 27 are arranged in a common plane and the vehicle headlight bulb is aligned during its operation so that the three power supply leads 25 to 27 are arranged above one another. The first filament 23 of the HB2 lamp, which serves to generate the low beam light, during operation at a voltage of 12 volts, has an electrical power consumption of 46.2 watts and a luminous flux of 910 lm±10% (measured at a test voltage of 12.8 volts). The first filament outlet near to the base of the low beam light filament 23 is connected to the third power supply lead 27. The second filament outlet of the low beam filament 23 away from the base is connected to a metallic low beam cap 28 partly surrounding the low beam filament 23. The low beam cap 28 for its part is welded to the first power supply lead 25, so that the low beam filament 23 is electrically contacted via the power supply leads 25 and 27 as well as via the low beam cap 28.

The second filament 24 of the HB2 lamp, which serves to generate a high beam light, during operation at a voltage of 12 volts, has an electrical power consumption of nominally 60 watts and a luminous flux of 1500 lm±10% (measured at a test voltage of 12.8 volts). It corresponds to the high beam filament of a conventional HB2 lamp. The two filaments 23, 24 are embodied as single coiled filaments. The first filament outlet near to the base of the high beam light filament 24 is connected to the angled end of the second power supply lead 26. The second filament outlet of the low beam filament 24 is connected to the third power supply lead 27. The winding axes of the two filaments 23, 24 are arranged in parallel offset to the lamp vessel axis. The filaments 23 and 24 usually consist of tungsten, while the power supply leads 25, 26 and 27 and the low beam cap 28 are made of molybdenum. The connection between the filament outlets of the filaments 23 and 24 with the power supply leads 25 to 27 or the low beam cap 28 are usually made in the conventional manner with the aid of small molybdenum tubes, which surround the filament outlets with a clamping seat and which are welded to the power supply leads or to the low beam cap. Table 4 shows a comparison of the coiled filament data.

TABLE 4

| | Low beam filament of the inventive HB2 lamp | Low beam filament of the conventional HB2 lamp |
|---|---|---|
| Core factor | 5.251 | 5.849 |
| Wire gauge | 161.9 μm | 188.1 μm |
| Coiled filament length | 5.51 mm | 5.78 mm |
| Pitch | 274 μm | 320 μm |
| Pitch factor | 1.695 | 1.70 |
| Power consumption | 46.2 W | 55 W |

The data of the low beam filament 23 of the inventive HB2 lamp is listed in the left-hand column of Table 4. The corresponding data of the low beam filament of conventional HB2 lamp is listed for comparison in the right-hand column of Table 4.

The filament data for the two-filament halogen lamp of type HB2 can also be used for two-filament halogen incandescent lamps of type H4, since the two lamps types are very similar in terms of mechanical design and light technology.

The invention is not restricted to the exemplary embodiments described in greater detail above, but can also be applied to further single-filament or two-filament halogen incandescent lamps. In addition the invention can also be applied to halogen incandescent lamps which are designed for use at another on-board network voltage, for example at an on-board network voltage of nominally 24 volts or 6 volts.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A halogen incandescent lamp for vehicle headlights with at least one filament, which is embodied such that it can be used as a light source for generating low beam light or high beam light, said halogen incandescent lamp being embodied as a single-filament halogen incandescent lamp, wherein the filament of the single-filament halogen incandescent lamp is embodied as a coiled filament, the length of which ranges from 4.20 mm to 4.35 mm and the pitch of which ranges from 250 μm to 260 μm and the wire gauge of which ranges from 148.9 μm to 153.1 μm, so that the filament, during its operation at a vehicle on board of nominally 12 volts has an electrical power consumption of less than 50 watts.

2. The halogen incandescent lamp as claimed in claim 1, wherein the halogen incandescent lamp has krypton in addition to the halogen filling as a filler gas.

3. The halogen incandescent lamp as claimed in claim 2, wherein the filler gas additionally contains xenon.

4. The halogen incandescent lamp as claimed in claim 1, wherein the halogen incandescent lamp has a vitreous lamp vessel surrounding the at least one filament with a dome embodied as opaque and light-reflecting.

5. A halogen incandescent lamp for vehicle headlights, said halogen incandescent lamp being embodied as a two-filament incandescent lamp with a filament to generate low beam light and high beam light respectively, wherein the filament to generate low beam light is embodied as a coiled filament, the length of which ranges from 5.4 mm to 5.6 mm and the pitch of which ranges from 265 μm to 285 μm and the wire gauge of which ranges from 159.6 μm to 164.1 μm, so that said filament to generate low beam light, during its operation at a vehicle on board network voltage of nominally 12 volts has an electrical power consumption of less than 50 watts.

6. The halogen incandescent lamp as claimed in claim 5, wherein the halogen incandescent lamp has krypton in addition to the halogen filling as a filler gas.

7. The halogen incandescent lamp as claimed in claim 6, wherein the filler gas additionally comprises xenon.

8. The halogen incandescent lamp as claimed in claim 7, wherein the halogen incandescent lamp has a vitreous lamp vessel surrounding the at least one filament with a dome embodied as opaque and light-reflecting.

* * * * *